(12) United States Patent
Trainoff

(10) Patent No.: US 10,712,321 B2
(45) Date of Patent: Jul. 14, 2020

(54) METHOD TO ELIMINATE PERIODIC NOISE FROM DATA COLLECTED WITH A CHROMATOGRAPHY SYSTEM

(71) Applicant: Wyatt Technology Corporation, Santa Barbara, CA (US)

(72) Inventor: Steven P. Trainoff, Goleta, CA (US)

(73) Assignee: WYATT TECHNOLOGY CORPORATION, Goleta, CA (US)

(*) Notice: Subject to any disclaimer, the term of this patent is extended or adjusted under 35 U.S.C. 154(b) by 487 days.

(21) Appl. No.: 15/341,791

(22) Filed: Nov. 2, 2016

(65) Prior Publication Data

US 2018/0120272 A1 May 3, 2018

(51) Int. Cl.
*G01N 30/86* (2006.01)
*G01N 30/74* (2006.01)
*G01N 30/78* (2006.01)

(52) U.S. Cl.
CPC ......... *G01N 30/8658* (2013.01); *G01N 30/74* (2013.01); *G01N 30/78* (2013.01); *G01N 30/8641* (2013.01); *G01N 30/8617* (2013.01)

(58) Field of Classification Search
CPC .... G01N 30/8658; G01N 30/74; G01N 30/78; G01N 30/8641; G01N 30/8617
USPC .......................................................... 702/32
See application file for complete search history.

(56) References Cited

U.S. PATENT DOCUMENTS

| | | | |
|---|---|---|---|
| 5,080,785 A | 1/1992 | Allington et al. | |
| 6,787,761 B2 | 9/2004 | Hastings | |
| 8,890,060 B2 * | 11/2014 | Ding | H01J 49/0036 250/281 |
| 9,923,520 B1 * | 3/2018 | Abdelfattah | H02M 1/08 |
| 2001/0027949 A1 * | 10/2001 | Safir | B01D 15/08 210/635 |
| 2005/0075851 A1 * | 4/2005 | Trainoff | G01N 30/8624 703/9 |
| 2005/0165320 A1 * | 7/2005 | Glass | A61B 5/02405 600/515 |
| 2007/0068229 A1 * | 3/2007 | Trainoff | G01N 11/08 73/54.06 |
| 2008/0201111 A1 | 8/2008 | Trainoff | |
| 2010/0280811 A1 | 11/2010 | Gorenstein et al. | |
| 2013/0087701 A1 | 4/2013 | Ivosev et al. | |

(Continued)

FOREIGN PATENT DOCUMENTS

CN 104133982 A 11/2014

*Primary Examiner* — Yoshihisa Ishizuka
(74) *Attorney, Agent, or Firm* — Leonard T. Guzman

(57) ABSTRACT

A method to filter out pump pulses from data collected with a chromatography system is disclosed. Baseline data is collected as a pump delivers solvent to an analytical instrument, which may be the IP signal of a capillary bridge viscometer. A Fourier transform is applied to the data to generate the power spectrum of the baseline signal. Fundamental and harmonic frequencies are determined and a comb filter is constructed therefrom and applied to sample collected from all of the affected instruments. The comb filter may be correlated to the pump and flow rate and stored in data analysis software or database. Other systems using other pumps may also generate associated comb filters, and the resulting filters and the flow rates at which they were generated may be stored in a database accessible to the data analysis software.

6 Claims, 9 Drawing Sheets

(56) References Cited

U.S. PATENT DOCUMENTS

2013/0267858 A1* 10/2013 Berkow ............ A61B 5/02028
600/479
2014/0067308 A1  3/2014 Cunnien et al.
2014/0334251 A1 11/2014 Shreve \* cited by examiner a)

b)

METHOD TO ELIMINATE PERIODIC NOISE FROM DATA COLLECTED WITH A CHROMATOGRAPHY SYSTEM

RELATED PATENTS AND APPLICATIONS

The following references related to the background and application of the present invention are hereby incorporated by reference.

Steven P. Trainoff, U.S. Pat. No. 7,213,439, issued 8 May 2007, "Automatic bridge balancing means and method for a capillary bridge viscometer."

Steven P. Trainoff, U.S. Pat. No. 7,331,218, issued 19 Feb. 2008, "Capillary bridge viscometer and method for measuring specific viscosity."

Steven P. Trainoff, PCT Application No. PCT/US16/41649, Filed 8 Jul. 2016, "Differential viscometer with solvent compressibility correction."

BACKGROUND

Liquid chromatography systems have sophisticated computer-controlled pumps that deliver solvent and sample through chromatography columns that fractionate the sample into its constituent components. The fractionated sample then flows through one or more analytical instruments, such as light scattering, refractive index, UV absorption, electrophoretic mobility, and viscosity detectors, to characterize its physical properties. During the analysis, the flow system provides a constant volume flow rate while minimizing flow and pressure variations. Modern chromatography pumps routinely supply fluid at tens to hundreds of bar with variations of 0.1% or less. They achieve this level of performance by using a series of techniques including pressure feedback at the pump head or using nonlinear pump strokes that correct for the effect of solvent compressibility (see, for example, Agilent 1200 Series Quaternary Pump User Manual, Agilent Technologies, Inc., Santa Clara, Calif.). Despite these impressive specifications the analytical instrument signals often show small periodic fluctuations in their baseline, referred herein as pump pulses. Some analytical instruments are particularly sensitive to the corrupting effect of pump pulses, which can obscure the primary measurement.

The performance of online differential viscometers is often limited by their ability to distinguish between a chromatography peak that produces a small change in viscosity that manifests as a pressure drop across a capillary, and a pump pulse that mimics one. Although differential viscometers are particularly prone towards pump pulse pickup, they are by no means the only analytical instruments that are affected. Differential refractive detectors also commonly display pressure pulses in the solvent baselines. Light scattering and UV/VIS absorption detectors tend to be relatively insensitive to pump pulses, but even so there are examples in the literature, which show that they too can be affected.

Pump pulses typically are observed as a periodic oscillation in the baseline of whatever signal the analytical instrument is measuring. When seen, the usual remedy is to reduce them at the source, either by performing maintenance on the pump to replace pistons and valve seals, or by adding external pulse dampeners such as the FlatLine™ models produced by Analytical Scientific Instruments US (Richmond, Calif.). However even when the pump is operating correctly, there will always been be residual pressure pulses that can be transduced by the analytical instrument chain.

The next step towards minimizing the effect of pump pulses is to design the analytical instruments to be as insensitive as possible to them, while retaining sensitivity to the physical effect they are intended to measure. There are a number of ways to design instruments to make them intrinsically less sensitivity to pump pulses, an example of which will be described below, but even after the pumps and the instrumentation have been optimized, the sensitivity of an instrument is often still limited by pump pulse pickup. It is a goal of this invention to correct the measured signals in software to eliminate the residual effects of pump pulses.

A BRIEF DESCRIPTION OF THE DRAWINGS

FIG. 1 shows a single capillary viscometer. Sample is injected between the pump and the viscometer. The pressure drop across the capillary is measured with a differential pressure transducer and is used to derive the viscosity of the sample.

Figure 8:
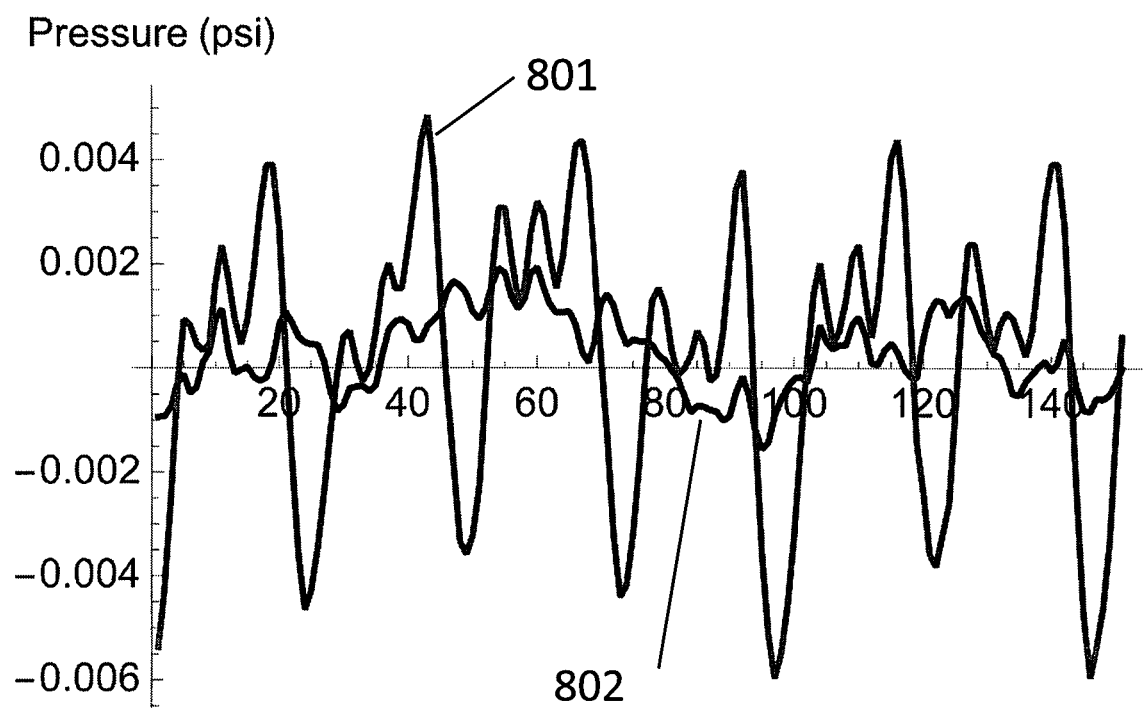

FIG. 8 contrasts the original IP signal with the filtered signal. The data sampling rate was 0.1 seconds.

Figure 9:
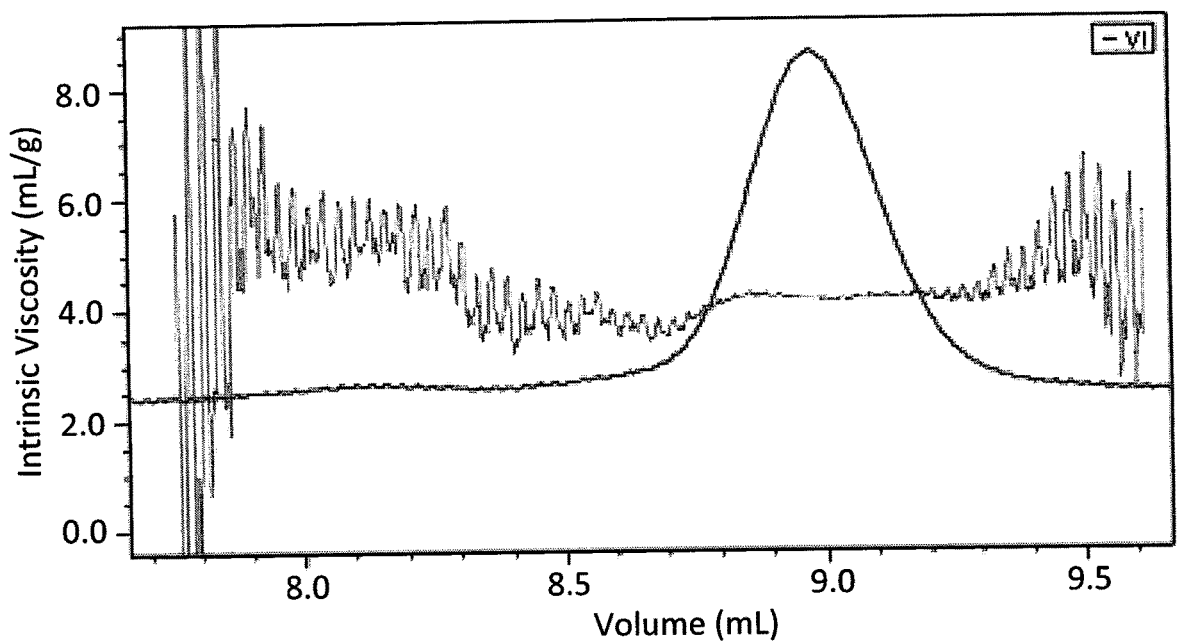
Figure 9:
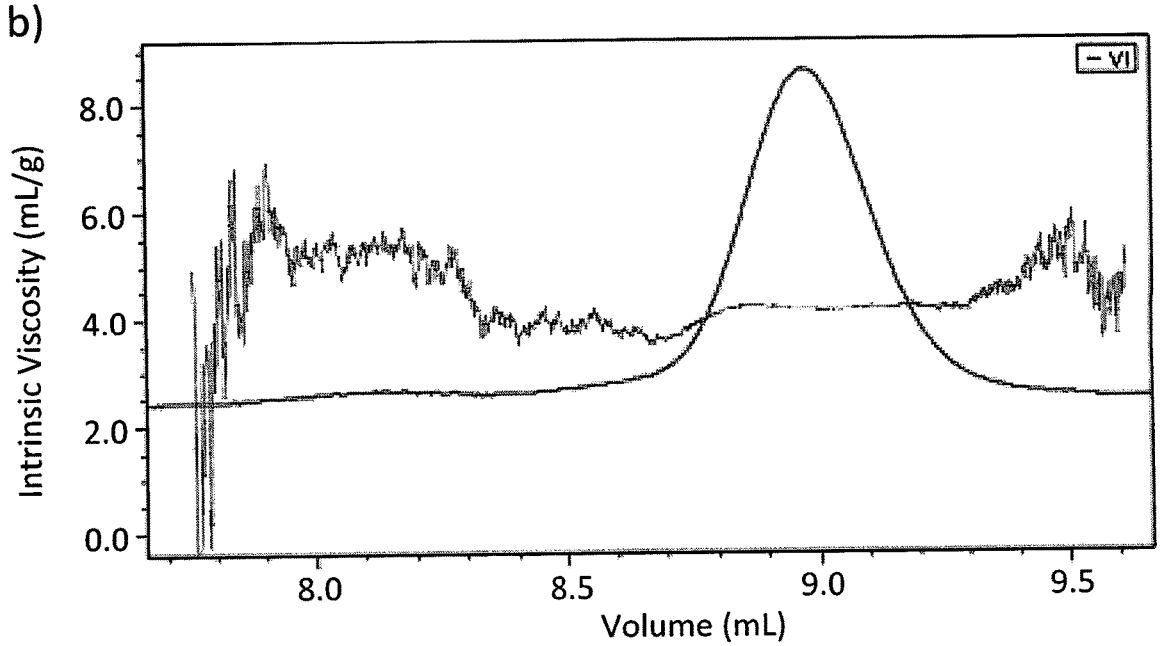

FIG. 9 shows both raw and filtered intrinsic viscosity vs. elution volume data for a BSA sample injection.

A DETAILED DESCRIPTION OF THE INVENTION

Figure 1:
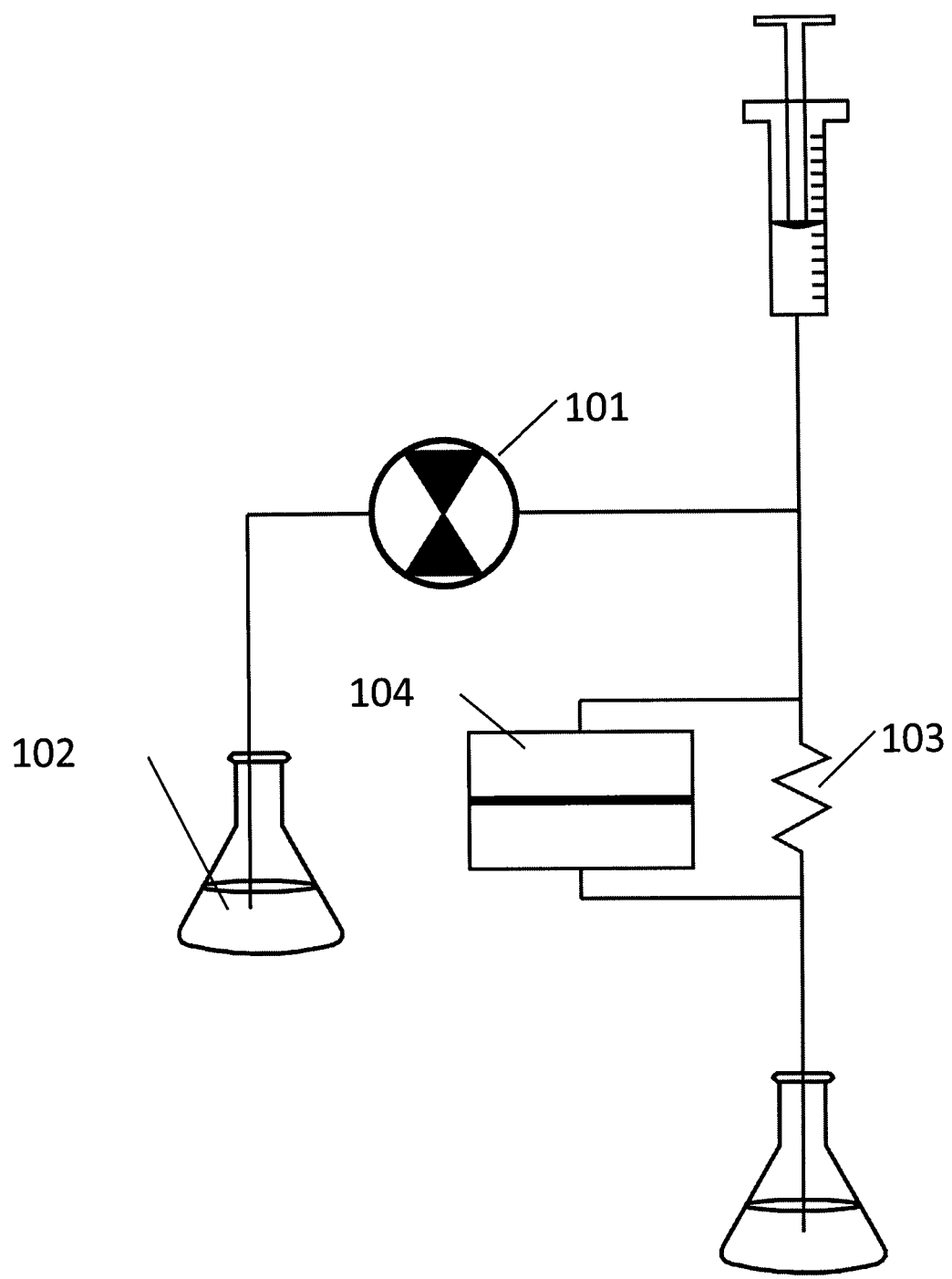

Designing Instruments to be Intrinsically Resilient to the Effect of Pump Pulses For definiteness consider an online viscometer that measures the change in viscosity of a fluid sample when a chromatography peak passes through the detector. One of the simplest implementations possible is the single capillary design, an example of which is shown in FIG. 1. A pump 101 draws fluid from a reservoir 102 and passes it through a sensing capillary 103. A differential transducer 104 measures the pressure across the capillary. The measured pressure is proportional to the flow rate and the sample viscosity. If one first flows solvent through the capillary and measures the baseline pressure $P_0$, and subsequently injects a sample, the specific viscosity is simply $$\eta_{sp}(t) = P_s(t)/P_0 - 1 \qquad (0)$$

where $P_s(t)$ is the pressure due to the sample. A critical problem arising from such a flowing system is that if the pump is not perfectly stable, pump pulses generate pressure signals that appear identical to changes in the sample viscosity. Since the output of the single capillary viscometer is directly proportional to the pressure, the sensitivity of such a device is limited by the quality of the pump used. High quality chromatography solvent delivery systems commonly provide solvent with pressure pulses less than 0.1%, so the ability to measure specific viscosity is limited to roughly 0.1% as well. One method of reducing the sensitivity to pump pulses in the instrument is taught by Haney in U.S. Pat. No. 4,463,598 (issued Aug. 7, 1984) in the form of a capillary bridge viscometer.

Figure 2:
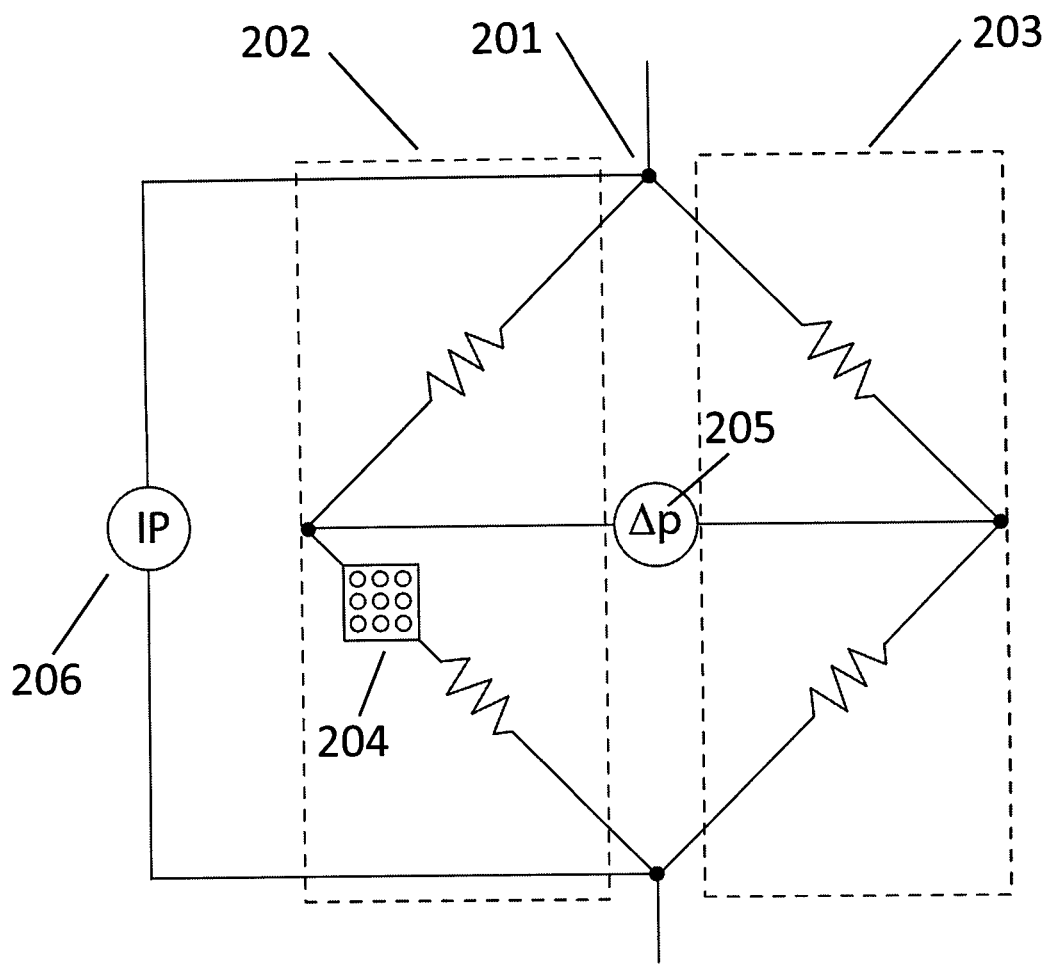
FIG. 2 is a depiction of a capillary bridge viscometer including a differential pressure transducer (DP) and an inlet pressure transducer (IP).

FIG. 2 is a schematic of a capillary bridge viscometer, where the fluid stream splits at the top of the bridge 201, and half of the sample flows through each bridge arm 202 and 203. Since the bridge is symmetric, the differential pressure transducer in the center of the bridge measures zero when all four arms are filled with solvent. When a sample is injected it flows into both arms. One arm of the bridge 202 contains an additional delay volume 204 so that the sample enters the delay volume 204, but the pure solvent that was present prior to sample injection exits, causing a pressure imbalance in the bridge, which is measured by a pressure transducer 205 in the center of the bridge. This imbalance pressure, combined with the inlet pressure measured by a separate pressure transducer 206 between the top and bottom of the bridge, gives the specific viscosity through the relation $$\eta_{sp} = \frac{\eta}{\eta_0} - 1 = \frac{4DP}{IP - 2DP}, \qquad (2)$$

where $\eta$ is the viscosity of the sample, and $\eta_0$ is the viscosity of the solvent, DP is the imbalance pressure across the bridge, and IP is the pressure from top to bottom of the bridge. This is a direct measurement of the specific viscosity that depends only on the calibrated transducers. At the end of the run, the delay volume is flushed with new solvent and a new measurement can be performed.

A primary technical advantage of a capillary bridge viscometer over a single capillary viscometer is that the bridge design naturally rejects pump pulses, since they necessarily affect both arms of the bridge nearly symmetrically. When properly implemented, the bridge can suppress the effect of pump pulses by two orders of magnitude or more. However pulse rejection is never perfect and residual pump pulses are sometimes still evident in highly sensitive viscometers such as the ViscoStar® (Wyatt Technology Corporation, Goleta, Calif.). These sensitive instruments utilize technologies which are the subject of U.S. Pat. No. 7,331,218 and PCT Application No. PCT/US16/41649 to maximize sensitivity and can measure specific viscosity down to approximately $10^{-6}$, which is up to an order of magnitude below residual noise from pump pulses, and therefore the improved sensitivity of measurements from these state-of-the-art viscometers is still limited by the pump stability.

Fortunately it is possible to determine which features of the chromatogram are due to the pump pulses and which are from the underlying measurement. The pumps that drive the pulses are computer controlled and generate piston strokes that are highly repeatable, with very accurate and stable drive frequencies. The essential observation is that the pump pulses seen in the detectors will reflect this underlying precise drive frequency. By analyzing baseline data that displays pump pulses, it is possible to determine the drive frequency of the pump and eliminate it from the data by designing a custom narrow band comb filter that blocks the pump frequency and its harmonics.

Figure 3:
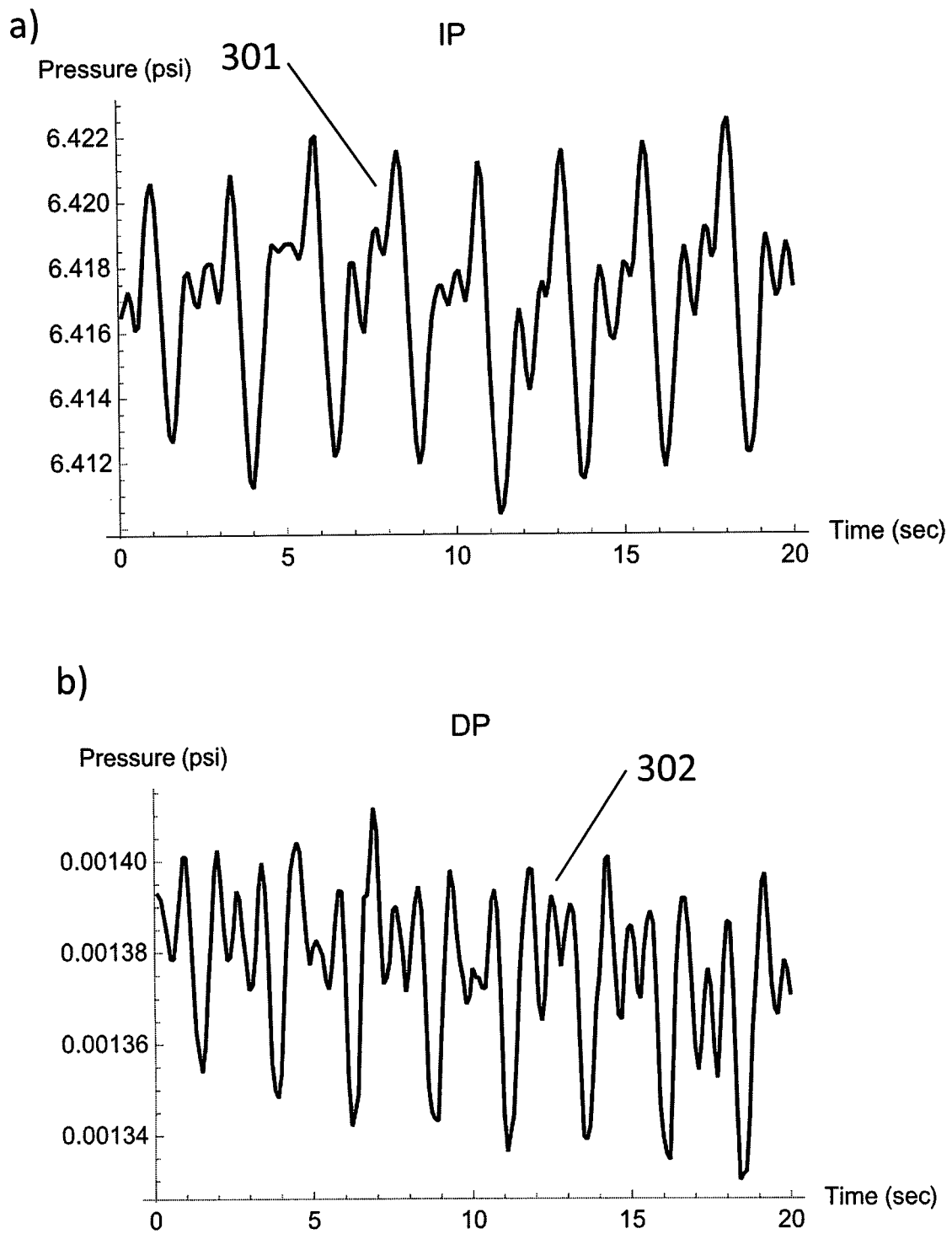
FIG. 3 shows plots of (a) IP and (b) DP baselines of an aqueous solvent with a 0.5 mL/min flow rate.

Any of the detector signals that display pump pulse contamination can be used to determine the underlying pump frequency. Once determined, the correction filter can be applied to all of the affected detectors. When the analytical instrument chain includes a single capillary or bridge viscometer, this detector is often the best reference because, by design, the IP transducer measures the pump pulses directly. IP and DP baseline signals of an aqueous solvent with a flow rate of 0.5 mL/min and a collection interval of 0.1 second collected by a ViscoStar®3 viscometer (Wyatt Technology Corporation, Goleta Calif.) are shown in FIG. 3. The IP signal 301 has a mean value of 6.4 psi due to the pressure drop in the bridge. The DP signal 302, however, is nearly zero due to the bridge being well balanced. Shown in FIG. 4 (a) is the power spectrum of the IP and DP signals shown in FIG. 3. Note that the pump pulses create a periodic "picket fence" of perturbations in the power spectrum. The fundamental frequency 401 for the pump is 0.4095 Hz and there are spikes visible at all of the harmonics 402. Since the pump signal is periodic, the harmonics are at precisely integer multiples of the fundamental frequency. It is also important to note that both detectors show spikes in the power spectrum at exactly the same frequencies. Therefore if one characterizes the pump frequency for one detector and designs a filter to remove it, the same filter can be used for all detectors so affected. There are also spikes visible that reflect (alias) off the Nyquist frequency of 5 Hz. One could extend the pump pulse elimination filter to eliminate these as well, but the spectral power contained in these peaks is small compared to the fundamental and the first few harmonics. In addition there are "other peaks" 403 in the power spectrum that are not multiples of the fundamental. Some of these other peaks represent a second frequency from the pump, and others are from electronic pickup from other noise sources. However, all of these other peaks contain very little spectral power, and although one could use the same algorithm to eliminate them as well, they will be ignored at the present time. The downward slope in the power spectrum presented in FIG. 4(a) at high frequency is due to a combination of analog electronic filtering, the frequency response of the sensor, and digital averaging that is part of the analog to digital conversion process. The essential point is that most of the effect of pump pulses is limited to a very narrow frequency range around the fundamental and its harmonics.

FIG. 4(b) shows a zoom in of the data of FIG. 4(a) around the fundamental frequency region. This power spectrum is from a collection of baseline from pure solvent, before any sample has been injected. The noise near DC is from 1/f noise, which combined with the pump pulse peak frequencies, can be seen at 404. Chromatography peaks are tens of seconds wide so the spectral power associated with them will show up frequencies near 0.1 Hz and below. They are well separated from the pump noise. Since there is a wide separation of time scales between the pump pulses and the chromatography peaks and the 1/f noise, the novel use of a suitably chosen filter can eliminate the noise spikes without affecting the chromatography peaks. The filter will remove a small band of frequencies around the fundamental pump frequency along with its harmonics. Such a filter is called a comb filter and it is an objective of the present invention to construct and apply an optimized filter to eradicate the pump pulses from all of the chromatographic signals.

An appropriate comb filter is constructed to have a notch at the fundamental frequency and its harmonics. The algorithm therefore has a series of steps:
  1. Finding the fundamental frequency
  2. Constructing the filter
  3. Applying the filter For each step there are several variants. The following section will describe the method used in a preferred embodiment. The entire process may be automated, but since the implementation employs some heuristics, it may be of value to an end user to present the intermediates so that the user can check to make sure that the algorithm is performing correctly.

In principle, the pump frequency depends only on the model of the pump and the flow rate. One could consider generating a table of known pumps and simply computing the fundamental for each pump based on the flow rate setting. However this method would require a significant research into the pumps currently available on the market and pumps no longer in production but still in use and would have to be continually maintained in order to account for new models as well as verification that the fundamental values don't depend on internal pump parameters (such as solvent compressibility). Moreover even though the frequency of a given pump is very stable, there is no guarantee that it will be exactly the same from pump to pump, even if they are the same model.

Figure 4:
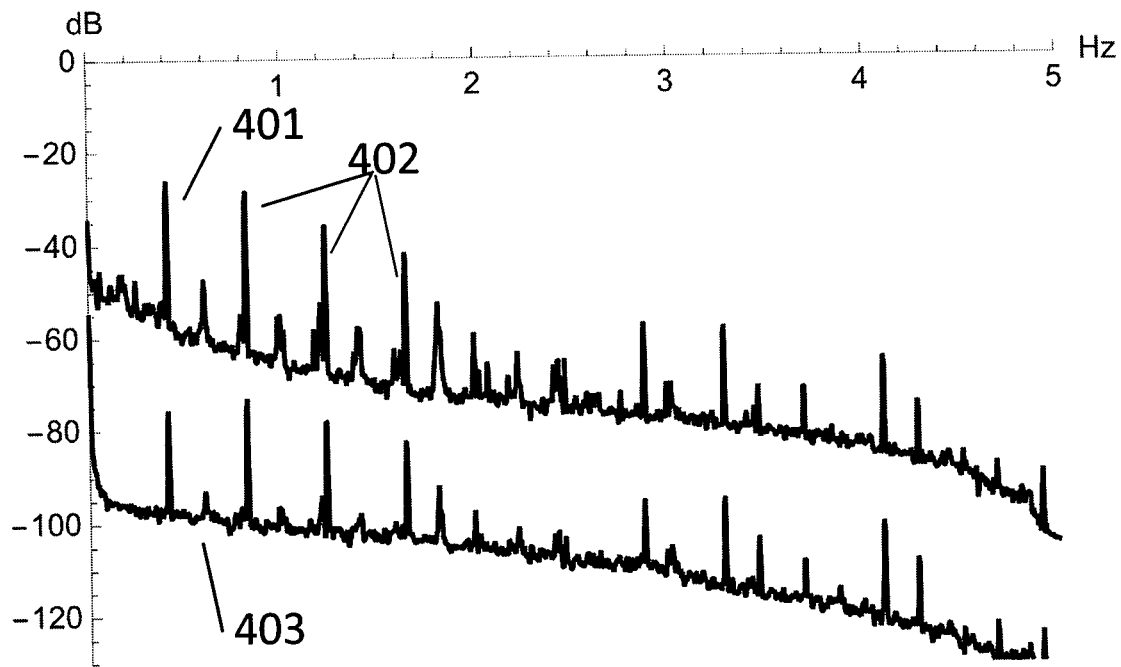
FIG. 4 shows the power spectrum of IP and DP baseline measurements for the collection presented in FIG. 3.
Figure 4:
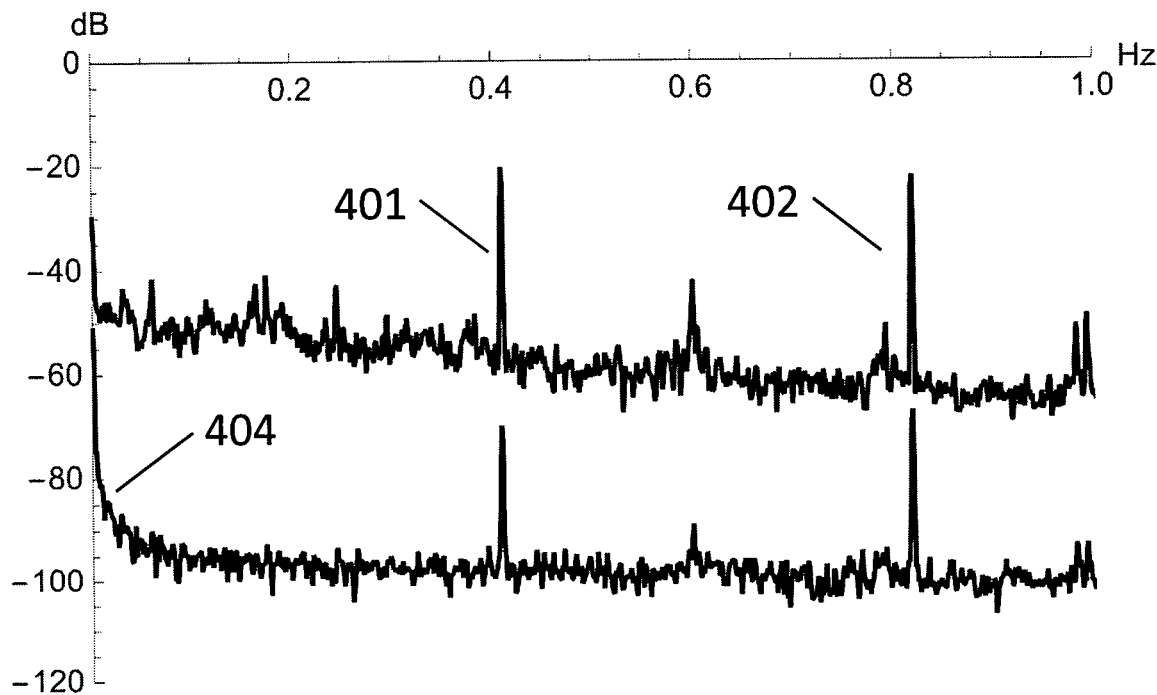

A better method is to determine the pump frequency from measurements of the pulses in each individual system. In this case, the user waits until the system is well equilibrated and then collects a solvent baseline. The software then computes the power spectrum as shown in FIG. 4. Next the software scans the power spectrum and searches for the fundamental peak. Because the pump frequency is so precise, the spectral power under the peak is much larger than the background noise, making it straightforward to identify, although there are some refinements that can improve the accuracy of the frequency measurement.

Since the pump oscillation is not synchronized with the instrument sampling, the pump period will not be commensurate with the sample frequency. The peak associated with the fundamental frequency of the pump will not fall exactly within a single bin of the power spectrum, causing the power contained to alias across several nearby bins. This effect is known as spectral leakage and does not prevent the method from working properly, but does reduce the accuracy with which the pump frequency is determined. One typically ameliorates this effect by applying a windowing function to the sample data before the fast Fourier transform (FFT) is computed. There are many windowing functions that can be used, but all of them have the characteristic that they go to zero at the start and end of the sample interval. This has the effect of convolving the power spectrum with the Fourier transform of the windowing function, reducing the aliasing artifacts. The choice of the windowing function is not critical, and for our analysis a Hann window, which is a single cycle of a sine wave, was chosen.

Another refinement that improves the accuracy of the pump frequency determination is to first fit the raw signal data to a line and then compute the power spectrum of the residuals. This removes any linear drift that would generate a large low frequency artifact and improves the performance of the windowing function.

Figure 5:
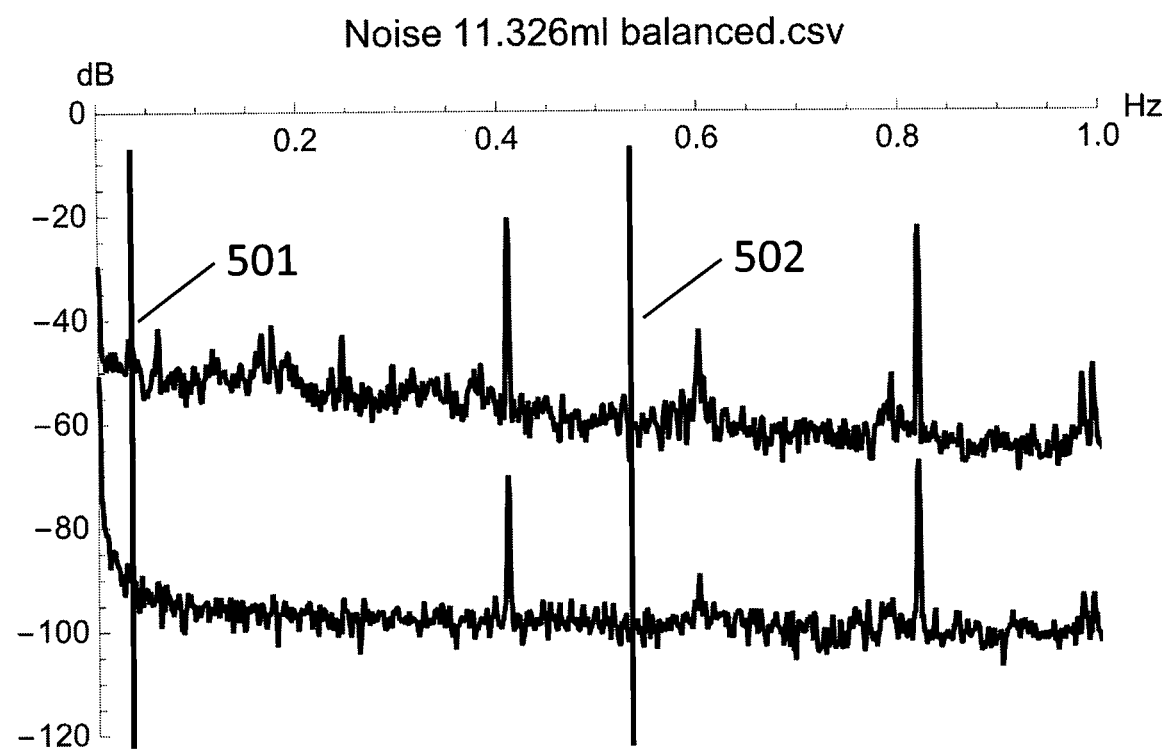
FIG. 5 illustrates the start and stop frequencies scanned for the largest peak for the data shown in FIG. 4.

The next subtlety is that even with the correction for drift, there is always 1/f noise in the power spectrum that shows up near zero frequency, as seen in FIG. 4(b). To avoid this artifact, the scan for the largest peak in the power spectrum does not start at zero frequency. Similarly the fundamental might not be the peak with the highest power. It sometimes happens that the second, third, or higher harmonic peak is larger than the fundamental. To address this issue, the software that finds the fundamental frequency has a start and stop frequency to limit its scan range. The positions of the start point 501 and the stop point 502, as generated by software for the data of FIG. 4, are shown graphically in FIG. 5. If the start and stop frequency range does not cross the second harmonic, or if the higher harmonics decrease in amplitude, this method is reliable. The start and stop limits may be set manually, however if one does not know a priori the approximate frequency of the peak, the algorithm applies another heuristic.

Consider the case in which the algorithm accidentally chooses the second or third harmonic instead of the fundamental. Call the measured frequency $w_m$. One can test $w_m/2$ and $w_m/3$ to determine if there is a peak present by checking if the power in this bin is much larger than its neighbors. If so, then the algorithm can determine that it has originally found the second or third harmonic and assign the fundamental frequency accordingly.

Even if the algorithm properly determines the fundamental frequency, there is some error associated with the frequency measurement that depends on the frequency resolution of the power spectrum. The longer one runs the baseline, the better is the frequency resolution and the more accurately the fundamental will be determined. Alternatively one could look explicitly for the nth harmonic and then compute the fundamental frequency as 1/n times the frequency of the nth harmonic. This could improve measurement accuracy by 1/n. Another technique is to fit the baseline signal S(t) to a nonlinear fit model of the form $$S(t) = a + bt + \sum_{i=1} A_i \sin(i\omega_0 t + \phi_i), \tag{0}$$

where a, b, $A_i$, $w_0$, $\phi_i$ are fit parameters. The fundamental is extracted directly as the $w_0$ fit parameter.

Figure 6:
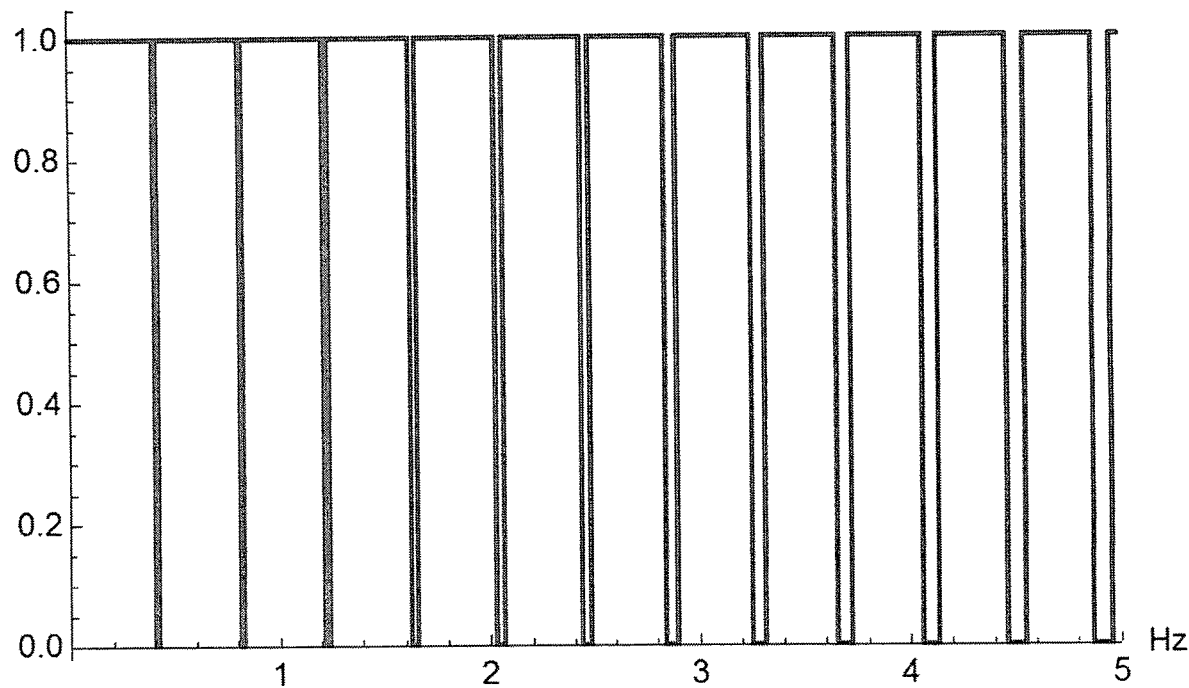
FIG. 6 shows the computed comb filter with notches at the fundamental and its harmonics. The notch width increases with harmonic number.
Figure 7:
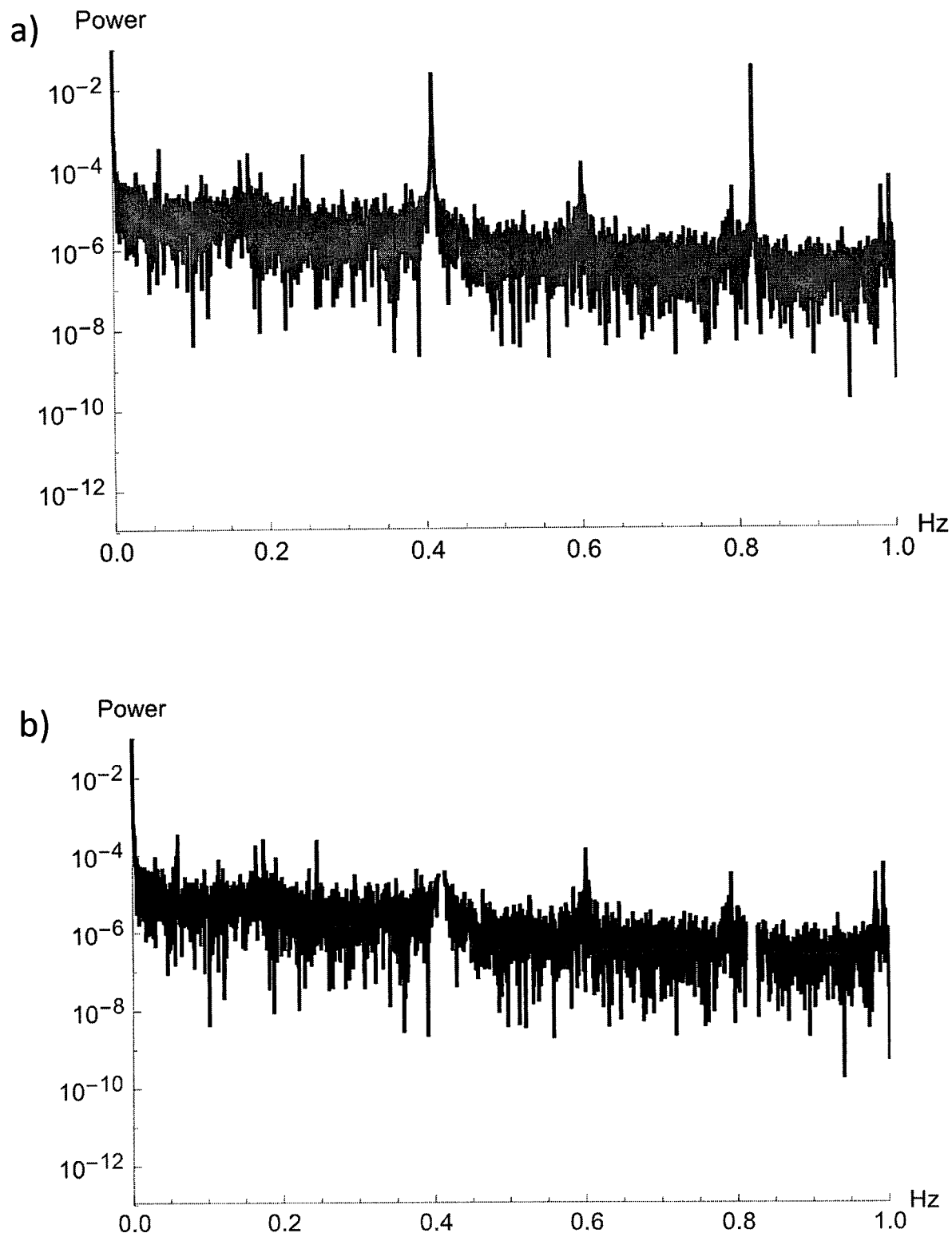
FIG. 7 shows the application of the comb filter by contrasting the power spectrum of (a) the unfiltered data and (b) data after applying the comb filter.

Once the fundamental frequency is determined, a comb filter is constructed to create a band-stop notch at this frequency $\pm \Delta w/2$ where $\Delta w$ is the width of the notch. Since the error associated with the accuracy with which the fundamental frequency is unknown, when one creates the notches around the nth harmonic, the associated band-stop is increased to $\pm n\Delta w/2$. The filter is defined as 1 when outside the band-stop notches, and 0 inside. FIG. 6 shows the resulting filter mask for the data presented in FIG. 4. After the computed comb filter is generated, it may be applied to the data. The power spectrum of IP both (a) before and (b) after applying the comb filter are displayed in FIG. 7. The narrow features are clipped out due to the pump pulses without affecting most of the power spectrum. As is well known in the art of signal processing, there are many variations possible in the width and phase behavior of the band pass filter, and this disclosure should not be considered limited to details set forth above.

The last step is to apply the filter. This is done by simply multiplying the Fourier transform of the signal by the mask and taking the inverse transform. Define the sampled detector signal as $s_n = S(n\Delta t)$. Then the discrete Fourier transform of $s_n$ is $$S_k = \sum_{n=0}^{N-1} s_n e^{-2\pi i k n / N} \tag{0}$$

where N is the number of samples in the collection. This can be computed efficiently by using the Fast Fourier Transform (FFT) algorithm. Call the sampled comb filter defined above as $c_k$. Then the clipped data in the frequency space $\tilde{S}_k$ that eliminates the pump frequencies is simply the product $$\tilde{S}_k = S_k c_k \quad (0),$$

which is then transformed back to the time domain by an inverse FFT as $$\tilde{s}_n = \frac{1}{N} \sum_{k=0}^{N-1} \tilde{S}_k e^{2\pi i k n/N}. \quad (0)$$

The corrected data $\tilde{s}_n$ is now nearly identical to the initial sampled data $s_n$ but free from pump pulses. An example of the application of this filter to the IP data series is shown in FIG. 8. As can be clearly seen, the periodic pulses of the original data 801 have been eliminated in the filtered data 802. Once the filter has been computed, it can be applied to all of the analytical signals to achieve pulse suppression. The fundamental frequency only needs to be determined when the system is set up or when the flow rate of the HPLC pump is changed. After these settings are established, the same filter can be used for all future analyses.

A further example of the power of the inventive filtering method disclosed herein is shown in FIG. 9. Here we see an injection of bovine serum albumin (BSA) into an analytical instrument chain that included a differential viscometer that measures the specific viscosity and a differential refractive index detector that measures the sample concentration. From these two detectors, the intrinsic viscosity [η] is computed through the relation $$[\eta] = \lim_{c \to \infty} \frac{\eta_{sp}}{c}. \quad (0)$$

The intrinsic viscosity is shown on the left axis and the specific viscosity is on the right axis. In panel (a) the raw detector signals are used in the calculation prior to filtering. The pump pulses are seen as an oscillation of the specific viscosity signal. The intrinsic viscosity is strongly affected, especially on the edges of the peak where the signal is small. Panel (b) shows the results after the comb filter has been applied to both the differential viscometer and differential refractive index signal. Note that the measured peaks shapes are unaffected by the filter but the results are dramatically improved. As with the previous example, the pump pulses present in the unfiltered data are absent after the correction is applied.

While this disclosure has concerned itself primarily with application to viscometric data, it should be noted that the method is useful in the filtering of other measurements sensitive to pump pulses. It utilizes data collected by the reference instrument, which is often the IP transducer of a bridge viscometer, to characterize the time scale of the pulses, and the resulting filter can be applied to all of the analytical instruments in the chromatography chain. Indeed a newly generated comb filter can be applied retroactively to existing data flies collected on a system with the same HPLC pump operating at the same flow rate to improve historical data.

As will be evident to those skilled in the arts of analytical instrument measurements, macromolecular characterization, chromatography, and signal processing there are many variations of the methods of the invention that do not depart from the fundamental elements listed for their practice; all such variations are but obvious implementations of the invention described hereinbefore and are included by reference to the claims, which follow.

The invention claimed is:

1. A method comprising:
    collecting data in a chromatography system with an analytical instrument,
        wherein the collected data comprises pump pulses caused by at least one pump in the chromatography system,
        wherein the at least one pump is computer controlled;
    computing a power spectrum of the pulses;
    determining a fundamental frequency of the pulses from the power spectrum of the pulses;
    constructing a filter to block the fundamental frequency and one or more harmonics of the fundamental frequency;
    applying the filter to the collected data, resulting in filtered data without the fundamental frequency and without the one or more harmonics; and
    wherein the determining comprises
        selecting a region of the power spectrum outside where 1/f noise is not present,
        determining a frequency $w_m$ corresponding to a maximum power signal in the region,
        analyzing power values of frequencies at $w_m/2$ and $w_m/3$ to determine if there is a peak in the power spectrum at the frequencies at $w_m/2$ and $w_m/3$, and
        determining the fundamental frequency to be
            $w_m$ if there is no peak in the power signal at $w_m/2$ or $w_m/3$,
            $w_m/3$ if there is a peak in the power signal at $w_m/3$, and
            $w_m/2$ if there is a no peak in the power signal at $w_m/3$ and if a peak is present at $w_m/2$.

2. The method of claim 1 wherein the filter is a band-stop filter spanning the drive frequency of the at least one pump.

3. The method of claim 1 wherein the filter is a comb filter comprising a plurality of band-stop filter notches,
    wherein one band-stop filter notch among the plurality of band-stop filter notches is configured to block the fundamental frequency and
    wherein remaining band-stop filter notches among the plurality of band-stop filter notches are configured to block the one or more harmonics.

4. The method of claim 3 wherein each of the plurality of band-stop filter notches is configured to increase in width with each harmonic of the fundamental frequency.

5. The method of claim 1 further comprising applying a windowing function to the collected data prior to the computing.

6. The method of claim 5 wherein the windowing function is a Hann window.

* * * * *